United States Patent
Ura et al.

(10) Patent No.: US 7,870,724 B2
(45) Date of Patent: Jan. 18, 2011

(54) LEAN $NO_x$ TRAP WITH PGM ZONED AXIALLY

(75) Inventors: Justin Ura, Livonia, MI (US); Joseph Theis, Rockwood, MI (US); Christian Goralski, Jr., St. Paul, MN (US)

(73) Assignee: Ford Global Technologies, LLC, Dearborn, MI (US)

( * ) Notice: Subject to any disclaimer, the term of this patent is extended or adjusted under 35 U.S.C. 154(b) by 1678 days.

(21) Appl. No.: 10/904,414

(22) Filed: Nov. 9, 2004

(65) Prior Publication Data

US 2006/0100098 A1     May 11, 2006

(51) Int. Cl.
| | |
|---|---|
| *B01D 53/56* | (2006.01) |
| *B01D 53/94* | (2006.01) |
| *B01J 23/02* | (2006.01) |
| *B01J 23/04* | (2006.01) |
| *B01J 23/38* | (2006.01) |
| *B01J 23/40* | (2006.01) |
| *B01J 23/58* | (2006.01) |
| *F01N 3/10* | (2006.01) |
| *F01N 3/20* | (2006.01) |
| *F01N 3/28* | (2006.01) |

(52) U.S. Cl. .............................. 60/299; 60/300; 60/301; 422/169; 422/170; 422/171; 502/325; 502/326; 502/328; 502/330

(58) Field of Classification Search .................. 502/325, 502/326, 328, 330; 422/169–171; 60/299–302
See application file for complete search history.

(56) References Cited

U.S. PATENT DOCUMENTS 5,397,545 A   3/1995   Balling et al.
5,525,307 A   6/1996   Yasaki et al.

(Continued)

FOREIGN PATENT DOCUMENTS

EP       1 094 206 A2     4/2001

(Continued)

OTHER PUBLICATIONS

UK Intellectual Property Office Search Report Under Section 15, Application No. GB0806993.2 Dated Aug. 4, 2008.

(Continued)

*Primary Examiner*—Ngoc-Yen M Nguyen
*Assistant Examiner*—Diana J Liao
(74) *Attorney, Agent, or Firm*—Damian Porcari; Brooks Kushman P.C.

(57) ABSTRACT

The present invention provides a thermally stable catalyst for treating automobile exhaust by-products is provided. The catalyst of the invention comprises a first section that includes a precious metal present in a first concentration and a second section that includes a precious metal present in a second concentration. The catalyst of the invention is characterized by a unique precious metal concentration profile in which the first concentration of the precious metal is lower than the second concentration of the precious metal. When placed with an automobile exhaust system, the second section is positioned downstream of the first section. The present invention also provides a lean $NO_x$ trap utilizing the unique precious metal concentration profile. The $NO_x$ trap is found to possess improved $NO_x$ conversion performance relative to a $NO_x$ trap with the same total amount of precious metal deposited uniformly over the volume of the trap.

20 Claims, 2 Drawing Sheets

U.S. PATENT DOCUMENTS

| | | |
|---|---|---|
| 6,336,320 B1 | 1/2002 | Tanaka et al. |
| 6,391,822 B1 * | 5/2002 | Dou et al. .................. 502/325 |
| 6,539,709 B2 * | 4/2003 | Kubo et al. .................. 60/301 |
| 2001/0003245 A1 | 6/2001 | Yahagi |
| 2003/0172645 A1 | 9/2003 | Schnaibel et al. |
| 2004/0055278 A1 | 3/2004 | Miyoshi et al. |
| 2004/0082470 A1 | 4/2004 | Gandhi et al. |
| 2006/0100098 A1 | 5/2006 | Ura et al. |
| 2006/0117736 A1 * | 6/2006 | Twigg ........................ 60/274 |
| 2006/0168948 A1 | 8/2006 | Xu et al. |
| 2008/0282670 A1 | 11/2008 | McCarthy et al. |

FOREIGN PATENT DOCUMENTS

| | | |
|---|---|---|
| EP | 1 273 733 A2 | 1/2003 |
| EP | 1 048 828 B1 | 4/2003 |
| GB | 2 313 796 A | 12/1997 |
| GB | 2 342 055 A | 4/2000 |
| WO | 2006080369 A1 | 8/2006 |

OTHER PUBLICATIONS

Joseph Theis, Jason Lupescu, Justin Ura, and Robert McCabe, "Lean $NO_x$ Trap System Design for Cost Reduction and Performance Improvement", 2006-01-1069, Copyright 2005 SAE International, pp. 1-16.

Joseph Theis, Justin Ura and Bob McCabe, "The Effects of Platinum and Rhodium on the Functional Properties of a Lean $NO_x$ Trap", SAE Paper 2007-01-1055, Ford Motor Company, Apr. 18, 2007.

* cited by examiner

LEAN NO$_x$ TRAP WITH PGM ZONED AXIALLY

CROSS-REFERENCE TO RELATED APPLICATIONS

This application is related to U.S. application Ser. No. 10/904,414, filed Nov. 9, 2004, Ser. No. 10/985,576 filed Nov. 9, 2004 and Ser. No. 10/985,578, filed Nov. 9, 2004.

BACKGROUND OF THE INVENTION

1. Field of the Invention

The present invention is related to automobile exhaust catalysts, and in particular, the present invention is related to thermally stable lean NO$_x$ traps.

2. Background Art

Environmental concerns and governmental regulations have been a continuing impetus for improvements in pollution control from automotive vehicles. The treatment or removal of noxious combustion by-products from the exhausts of such vehicles is a major focus of such efforts. Typically these combustion by-products include incomplete combustion by-products such as carbon monoxide and hydrocarbons. Moreover, the exhausts of these vehicles also include various nitrogen oxides. It is desirable and mandated that each of these compounds be reduced during vehicle operation.

Lean NO$_x$ traps are the technology of choice for treating the NO$_x$ emissions from lean-burn engines. The NO$_x$ traps are specially formulated with alkali metal or alkali-earth metals in the washcoat to enhance NO$_x$ storage capability. Under lean conditions, platinum in the washcoat oxidizes NO in the exhaust to NO$_2$. The NO$_2$ then reacts with the alkali-earth or alkali metals in the washcoat and some additional oxygen to form nitrates. Periodically, as the NO$_x$ storage capacity of the NO$_x$ trap is approached, the A/F ratio must be driven to a rich condition for a short time. Under these conditions, the nitrates decompose, releasing the stored NO$_x$ which then reacts with the reductants in the exhaust (HC, CO, and H$_2$) over the precious metal to form N$_2$. This purges the trap and regenerates the NO$_x$ storage capacity of the trap.

NO$_x$ traps are most effective at storing NO$_x$ under lean conditions in a temperature window that is typically in the approximate range of 250° to 450° C. At lower temperatures, the oxidation of NO to NO$_2$ is slow and limits the storage performance. At higher temperatures, the thermodynamic stability of the nitrates decrease, limiting the amount of NO$_x$ that can be stored. At temperatures between 250° and 400° C., the NO$_x$ storage performance typically increases with increasing platinum loading due to an increase in the NO oxidation rate, particularly after high temperature aging. Above 400° C., the influence of the precious metal concentration decreases because the rate of NO oxidation increases. At these higher temperatures, the NO$_x$ storage performance is limited more by the amount of NO$_x$ storage sites, which is a function of the volume of the trap. This encourages the use of large NO$_x$ trap volumes with high platinum levels in order to provide good NO$_x$ storage performance at both low and high temperatures. However, this increases the cost of the aftertreatment system.

Due to the temperature sensitivity of the NO$_x$ storage performance, the NO$_x$ traps are typically placed in the underfloor location on vehicles. Small close-coupled catalysts are usually placed close to the exhaust manifold to provide fast light-off after a cold start. This configuration is beneficial for the durability of the NO$_x$ trap for two reasons. By being placed in the underfloor location, the NO$_x$ trap is not exposed to the high inlet temperatures that can occur at the exhaust manifold during high load operation. A second reason is that the engine is normally operated at stoichiometry during high load operation. Under these conditions, the HC, CO, and NO$_x$ in the exhaust are converted to CO$_2$, H$_2$O, and N$_2$ at the precious metal sites. These reactions are exothermic and create local hot spots at the precious metal sites and the surrounding washcoat. This exotherm is highest in the front of the catalyst, where the concentrations of HC, CO, and NO$_x$ are highest, and drops as the concentrations decrease down the brick. This tends to age the front of the catalyst more than the rear of the catalyst. Therefore, having the NO$_x$ trap placed behind the close-coupled catalyst(s) is beneficial for the durability of the trap because the close-coupled catalysts will convert a high percentage of the HC, CO and NO$_x$ during high temperature operation, protecting the NO$_x$ trap from at least some of the exothermic reactions. However, even when aged behind a close-coupled three-way catalyst, the front zone of the NO$_x$ trap ages more than the back zone, possibly due to the conversion of HC, CO, and NO$_x$ that break through the three-way catalyst and react on the front zone of the NO$_x$ trap.

To reduce the cost of the aftertreatment system, there exists a need to reduce the precious metal loading in the NO$_x$ trap while maintaining good NO$_x$ conversion performance.

SUMMARY OF THE INVENTION

The present invention overcomes one or more problems of the prior art by providing, in one embodiment, a catalyst that may be incorporated into an automobile exhaust system. The catalyst of the invention is used to assist in the removal of by-products from an internal combustion engine. The catalyst of the invention comprises a first section that includes a precious metal present in a first concentration, and a second section that includes a precious metal present in a second concentration. When the catalyst is place in the automobile exhaust, the second section is downstream of the first section. The catalyst of the present invention is further characterized in that the concentration profile of the precious metal is such that the first concentration of the precious metal is lower than the second concentration of the precious metal. The catalyst of the invention is found to have improved thermal stability. In particular, when the catalyst is designed to function as a lean NO$_x$ trap or to be incorporated in such a trap, improved NO storage capacity after thermal aging is observed. Specifically, by using a lower concentration of precious metal in one axial zone of the trap and a higher concentration of precious metal in the remainder of the trap, the NO$_x$ conversion performance of the trap is higher than that of a similarly-sized trap with the same total amount of precious metal distributed uniformly throughout the trap. This zoning (e.g., precious metal concentration profile) of the precious metal concentration is referred to as reversed PGM zoning since it is opposite the zoning profile typically used in the prior art. Accordingly, the NO$_x$ conversion performance per gram of precious metal is maximized. Placement of the higher loaded section downstream of the lower loaded section improves the durability of the NO$_x$ trap presumably by protecting the zone with the higher precious metal concentration from the exothermic reactions that occur from HC, CO, and NO$_x$ conversion during high temperature aging, thereby enhancing the ability of the trap to maintain good NO$_x$ conversion at low temperatures after aging.

Another benefit of the reverse PGM zoning of the present invention relates to NOx storage at high temperatures (e.g., 500 C). The first step in the storage of NOx is the oxidation of NO to NO2 over the precious metal. At these high temperatures, the kinetics of NO oxidation are sufficiently fast that the effect of the precious metal loading on the NO oxidation is fairly small. However, the precious metal also catalyzes the decomposition of the nitrates under lean conditions. Higher precious metal loadings increase this nitrate decomposition at high temperatures, thereby decreasing the ability of the trap to store NOx under those conditions. Therefore, lower precious metal loadings are an advantage for NOx storage at high temperatures. Higher precious metal loadings also increase the oxygen storage capacity of the trap, which increases the fuel required to purge the trap. Therefore, the NOx trap should contain a zone of low precious metal concentration in order to improve its ability to store NOx under lean conditions and to convert it during the rich purges when operating at high temperatures. A benefit of the reverse zoning concept is that the low-loaded zone is in the front of the catalyst. Therefore, at high temperatures, NOx will be stored effectively in this front zone. In addition, the oxygen storage capacity of the front zone will be relatively low due to the lower precious metal loading. This makes it easier to purge the front zone of the trap, which is a benefit for fuel economy. If the low loaded zone were in the rear part of the catalyst and some NOx was stored in that zone, the oxygen storage capacity of the higher loaded front zone would have to be overcome in order to purge the lower loaded rear zone, thereby increasing the fuel required to purge the trap.

DETAILED DESCRIPTION OF THE PREFERRED EMBODIMENT(S)

Figure 1:
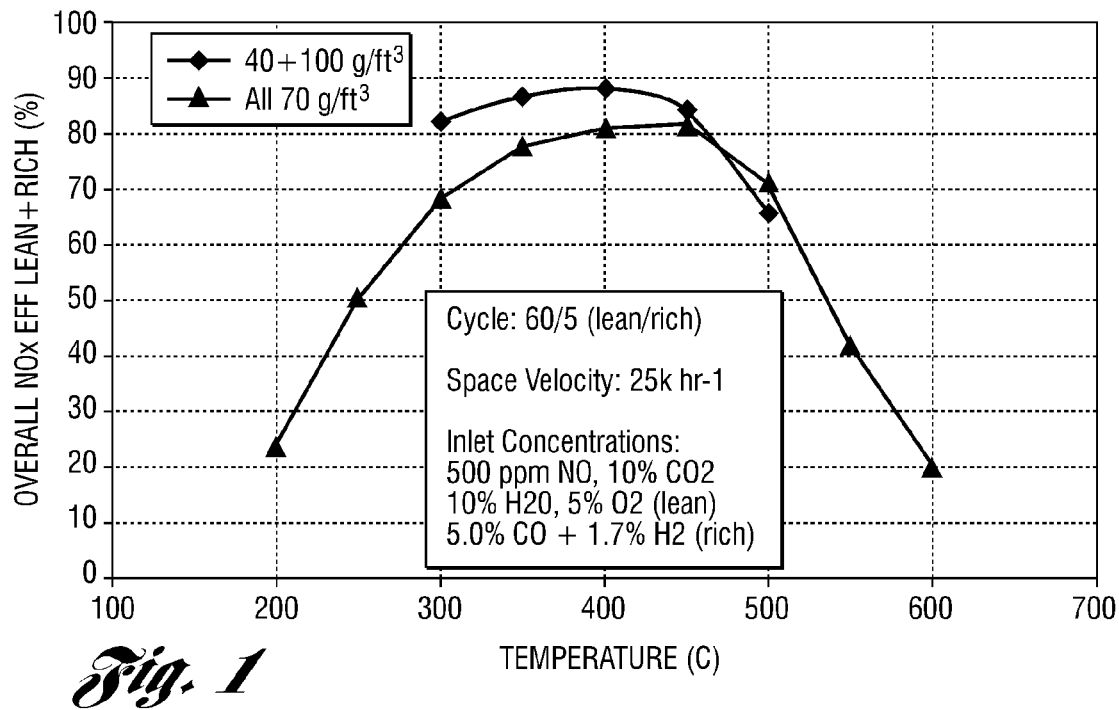
FIG. 1 is a plot of the $NO_x$ conversion on a 60 second lean/5 second rich test with 5% $CO+1.7\%$ $H_2$ during the 5 second purges for $NO_x$ traps aged 50 hrs at an inlet temperature of 800° C. behind three-way catalysts that were aged on a high temperature aging cycle producing maximum bed temperatures of 1000° C. in the three-way catalyst.

Reference will now be made in detail to presently preferred compositions or embodiments and methods of the invention, which constitute the best modes of practicing the invention presently known to the inventors.

In an embodiment of the present invention, a catalyst for treating automobile exhaust by-products is provided. In particular, the catalyst of the invention is used to treat the automobile exhaust through one or more exothermic reactions (i.e., the catalyst catalyzes reactions that are exothermic). Although such reactions may be described by a number of elementary chemical reactions, the net sum of such elementary steps is exothermic. For example, the three main reactions that occur in a NOx trap or a TWC are all exothermic (oxidation of HC and CO, reduction of NOx). The catalyst of this embodiment comprises a first section that includes a precious metal present in a first concentration and a second section that includes a precious metal present in a second concentration. Moreover, the second section is positioned downstream of the first section when the catalyst is placed in an automobile exhaust system. The precious metal concentration profile is further characterized in that the precious metal concentration varies by less than about 20 weight percent along planes in the catalyst that are perpendicular to an axial direction from the first to the second section. When positioned in an automobile exhaust, these perpendicular planes in the catalyst are perpendicular to the flow direction of the automobile exhaust gases as these gases flow through the catalyst. Typically, the precious metal concentration is substantially constant along these perpendicular planes. As used herein "substantially constant" means that the concentrations are not purposely varied along these planes although varies phenomena such as edge effects may cause variations that are less than about 10 wt. % and more typically are less than about 5 wt. %. The catalyst of the present invention is further characterized in that the concentration profile of the precious metal is such that the first concentration of the precious metal is lower ("lower loading") than the second concentration of the precious metal ("higher loading"). It has been surprisingly discovered that when an automobile exhaust catalyst has such a concentration profile, the thermal stability of such a catalyst is improved as compared to a catalyst in which the precious metal is uniformly present. This improved stability is particularly striking when the catalyst is incorporated into a $NO_x$ trap. In this application, the $NO_x$ trap is observed to possess improved $NO_x$ storage capacity upon thermal aging when compared to a $NO_x$ trap with a substantially uniform concentration of precious metal (i.e., the NO storage capacity is higher). In a variation of the invention, the first section (with the lower precious metal loading) is between 20 and 70% of the volume of the catalyst. In another variation of the invention, the first section is between 40 and 60% of the volume of the catalyst.

The precious metal concentration profile of the present invention should be contrasted to certain three-way catalyst systems that have a staggered or zoned noble metal distribution. However, in these systems the higher loaded section is typically the upstream section of the catalyst system in order to maximize the lightoff performance of the system. Accordingly, the arrangement of the noble metal in the present invention, where the higher loaded section is downstream of the lower loaded section, is unexpected and unique.

The concentration profile of the precious metal may be achieved in a number of ways resulting in numerous specific concentration profiles so long as the first and second section with the requisite relative concentrations may be identified. For example, in a variation of the invention, the first section has a first section region over which the concentration of precious metal is substantially constant, and a second section has a second section region over which the concentration of precious metal is substantially constant. In order to fulfill the concentration profile requirement of the invention, the first section region has a lower concentration of precious metal than the second section region. In another variation of the invention, the first concentration of precious metal varies over the first section and the second section of precious metal varies over the second section. In this variation, the first section has a first average concentration of precious metal and the second section has a second average concentration of precious metal. Again, in order to fulfill the concentration profile requirements of the invention, the first average concentration is lower than the second average concentration.

The present invention contemplates that the specific values of the precious metal may be any value that is physically obtainable and useful for treating automobile exhaust gases. In one variation of the invention, the first concentration of precious metal is from about 10 grams/ft$^3$ to about 110 grams/ft$^3$ and the second concentration of precious metal is from about 60 grams/ft$^3$ to about 200 grams/ft$^3$. In another variation of the invention, the first concentration of precious metal is from about 20 grams/ft$^3$ to about 70 grams/ft$^3$ and the second concentration of precious metal is from about 50 grams/ft$^3$ to about 160 grams/ft$^3$. In yet another variation of the invention, the first concentration of precious metal is from about 30 grams/ft$^3$ to about 60 grams/ft$^3$ and the second concentration of precious metal is from about 40 grams/ft$^3$ to about 130 grams/ft$^3$. In addition to the specific precious metal concentrations of the first and second sections of the catalyst, the catalyst is also characterized by an average concentration of the precious metal over all sections. In one variation, the catalyst has an average concentration of precious metal is from about 30 grams/ft$^3$ to about 150 grams/ft$^3$. Alternatively, the precious metal of the catalyst is characterized by the average concentration which may be from about 40 to about 100 grams/ft$^3$. It should be appreciated that typically the catalysts of the invention will contain precious metals in the same total amounts or less than catalysts which do not incorporate the unique concentration profile of the invention. Moreover, it should also be appreciated that the selection of the precious metals will be those typically used in the field of automobile exhaust gas treatment. Such precious metals include, for example, a metal selected from the group consisting of platinum, palladium, rhodium, and mixtures thereof.

In a particularly useful embodiment of the invention, the catalyst of the invention is incorporated into a lean NO$_x$ trap that exhibits improved thermal stability. The lean NO$_x$ trap of this embodiment includes a first section that comprises a precious metal present in a first concentration and a first NO$_x$ absorber. The lean NO$_x$ trap further includes a second section that also comprises a second concentration of a precious metal and a second NO$_x$ absorber. When the lean NO$_x$ trap is placed in an automobile exhaust system, the second section is positioned downstream of the first section. Moreover, the concentration profile and the selection of the precious metal is the same as those set forth above. In general, the first concentration of the precious metal is lower than the second concentration of the precious metal.

The first and second NO$_x$ absorber are each independently selected from the group consisting of oxides of alkali metals, oxides of alkaline earth metals, and combinations thereof. In a variation of the invention, the first and second NO$_x$ absorber are each independently selected from the group consisting of cesium oxide, potassium oxide, magnesium oxide, sodium oxide, calcium oxide, strontium oxide, barium oxide, and combinations thereof.

The catalysts of the present invention are advantageously incorporated into automobile exhaust systems. This is particularly true when the catalyst of the invention is contained in a lean NO$_x$ trap. Such automobile exhaust systems will also typically contain one or more additional catalysts. For example, in addition to the lean NO$_x$ trap of the invention, such an automobile exhaust system may include a three-way catalyst positioned upstream of the lean NO$_x$ trap. Such upstream three-way catalysts are typically placed close to the exhaust manifold of the internal combustion engine (within 3 feet) to provide fast light-off after a cold start (often referred to as close coupled three-way catalysts). Such close-coupled three-way catalysts as used on lean-burn vehicles are often small in volume. During high temperature aging, therefore, some of the HC, CO, and NO$_x$ can slip through the TWC due to the high flow rates, with the result that some of the HC, CO, and NO$_x$ can still react on the NO$_x$ trap. The durability of the zoned noble metal system is improved when the higher loaded zone (the second section) is placed behind the lower loaded zone (the first section) is accordance with the present invention. With this arrangement, the higher loaded zone, which is needed to provide good NO$_x$ storage performance at low temperatures after aging, is protected from most of the exothermic reactions during high temperature aging.

The following examples illustrate the various embodiments of the present invention. Those skilled in the art will recognize many variations that are within the spirit of the present invention and scope of the claims.

With reference to FIG. 1, the NO$_x$ storage efficiency of a trap having a uniform concentration of precious metal is compared to that of a two-section trap. Specifically, FIG. 1 compares the NO$_x$ conversion efficiency on a 60 second lean/5 second rich cycle ("60/5 test") for a one-inch core of a NO$_x$ trap loaded at 70 g/ft$^3$ precious metal with two half-inch cores of the same formulation where the front half is loaded at 40 g/ft$^3$ and the back half is loaded at 100 g/ft$^3$. Prior to testing, these catalysts were aged for 50 hours at an inlet temperature of 800° C. on a pulse-flame combustion reactor behind three-way catalysts that were aged on a high temperature aging schedule with a maximum bed temperature of 1000° C. Both traps for this analysis have substantially the same physical dimensions. For the 40/100 combination, 1" cores of 40 g/ft$^3$ and 100 g/ft$^3$ were aged separately, and then the front half of the 40 g/ft$^3$ piece was tested in front of the back half of the 100 g/ft$^3$ piece. As can be seen in FIG. 1, the 40/100 loading combination outperforms the uniform 70 g/ft$^3$ loading at 400° C. and below, where the precious metal concentration has a significant influence on the NO$_x$ storage performance. However, at 450° and 500° C., where the noble metal concentration has less influence, the performance is similar between the two systems.

Figure 2:
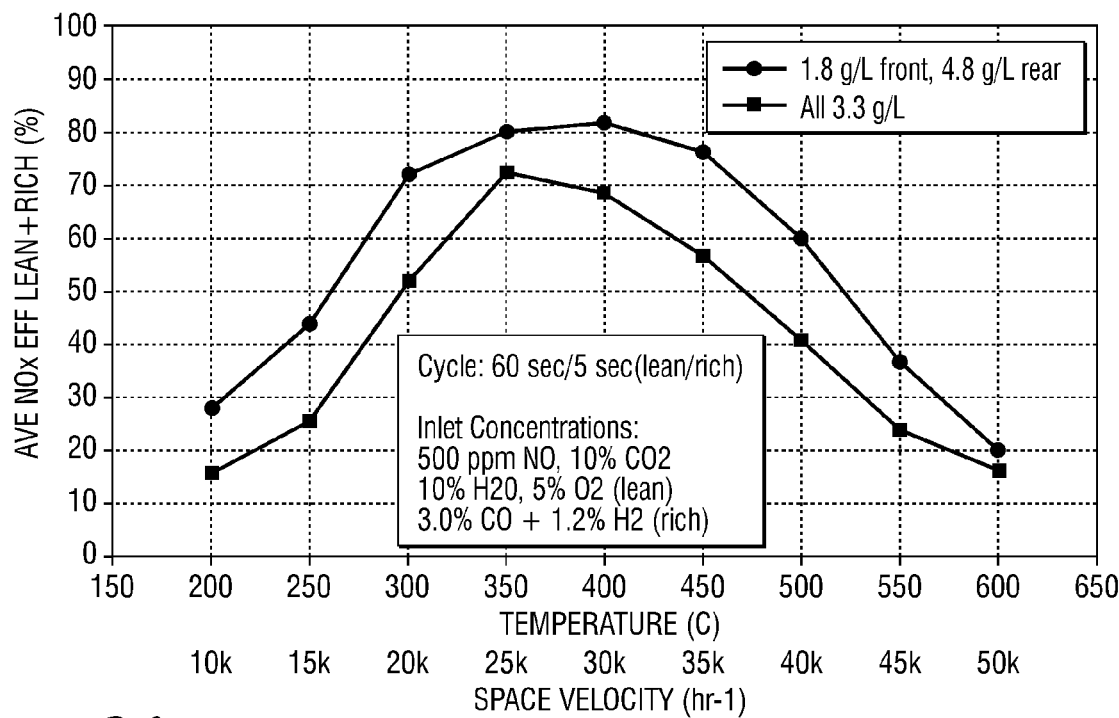
FIG. 2 is a plot of $NO_x$ conversion on a 60 second lean/5 second rich test with 3.0% $CO+1.0\%$ $H_2$ during the 5 second purges for $NO_x$ traps aged 50 hrs on a high temperature aging cycle producing maximum bed temperatures of 1000° C.

The tests in FIG. 1 were performed at a constant space velocity of 25000 hr$^{-1}$. However, on a vehicle, the flow rate normally increases as the temperature increases. Therefore, tests were run on samples of another NO$_x$ trap formulation after the samples were aged for 50 hours on a high temperature aging schedule with maximum bed temperatures of 1000° C. These NO$_x$ traps were aged with no three-way catalyst in front during the aging. Samples were aged with 1.8 g/liter Pt/Rh, 4.8 g/liter Pt/Rh, and 3.3 g/liter Pt/Rh. For the performance evaluations, the flow was increased as the temperature increased, so that as the temperature increased from 200° C. to 600° C., the space velocity was increased linearly from 10,000 hr–1 to 50,000 hr$^{-1}$. The front ½" of the 1.8 g/L sample was tested in front of the rear ½" of the 4.8 g/L sample and compared to the performance of the 1" sample with the 3.3 g/L loading, which contained the same total amount of noble metal. FIG. 2 shows that the 1.8+4.8 g/L combination outperformed the uniform 3.3 g/L loading at all temperatures.

Figure 3:
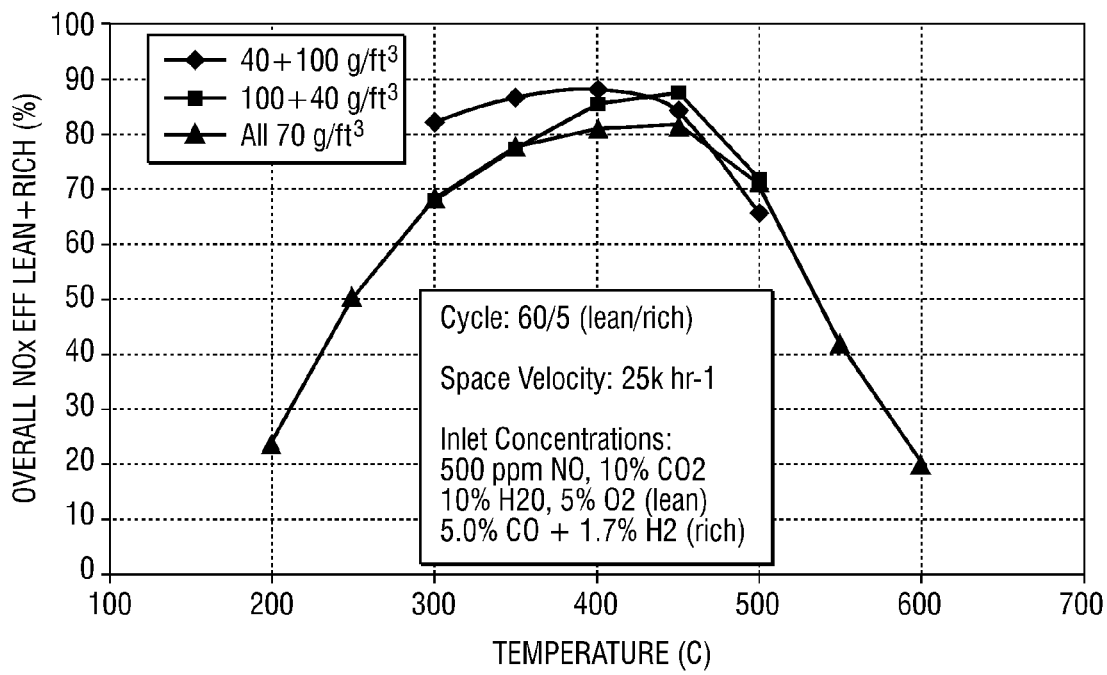
FIG. 3 is a plot of the $NO_x$ conversion on a 60 second lean/5 second rich test with 5% $CO+1.7\%$ $H_2$ during 5 second purges for $NO_x$ traps aged 50 hrs at an inlet temperature of 800° C. behind three-way catalysts that were aged on a high temperature aging cycle producing maximum bed temperatures of 1000° C. in the three-way catalyst.

FIG. 3 compares the performance of the 40/100 g/ft$^3$ system from FIG. 1 with a 100/40 g/ft$^3$ system, where the front half of the aged 100 g/ft$^3$ sample was evaluated in front of the rear half of the aged 40 g/ft$^3$ sample. As can be seen, the 40/100 system outperforms the 100/40 system at 300° and 350° C. Again, this improvement at low temperatures is attributed to better retention of low temperature performance from the 100 g/ft$^3$ section when it is aged in the rear position. The 100/40 system performs about the same as the uniform 70 g/ft³ system at these temperatures, and this is attributable to the fact that the 100 g/ft³ zone has been degraded more in the front position.

Figure 4:
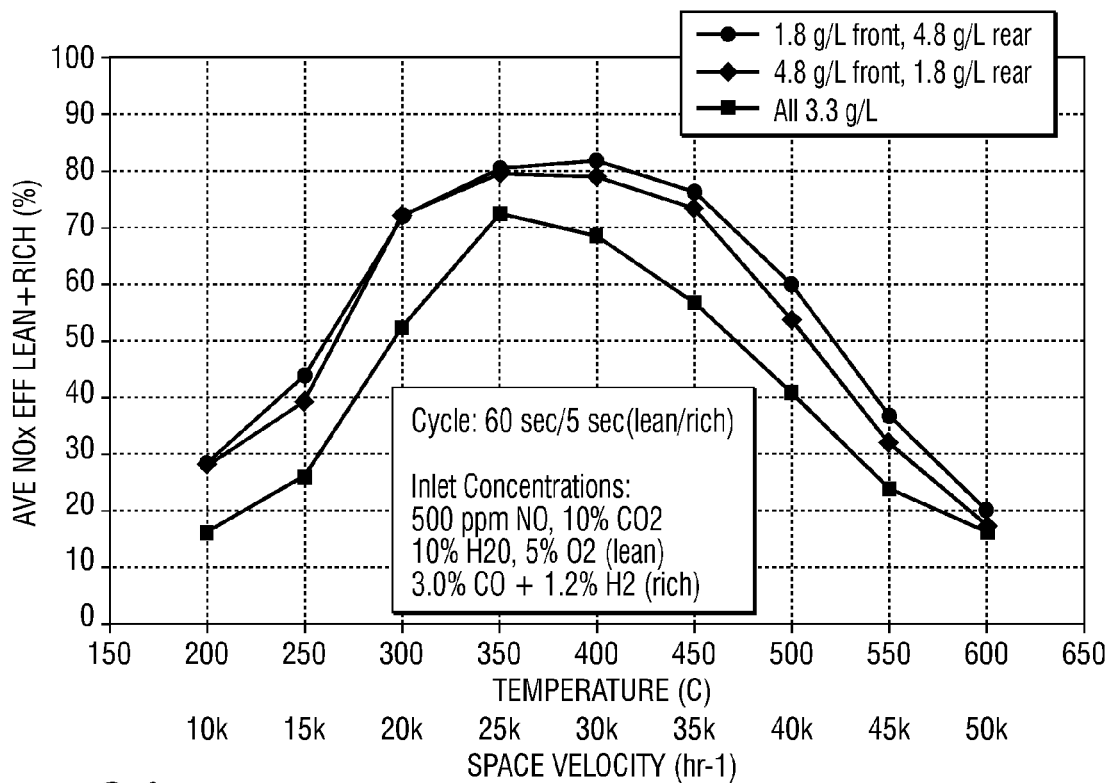
FIG. 4 is a plot of the $NO_x$ conversion on 60 second lean/5 second rich test with 3.0% $CO+1.0\%$ $H_2$ during 5 second purges for $NO_x$ traps aged 50 hrs on a high temperature aging cycle producing maximum bed temperatures of 1000° C.

FIG. 4 compares the results of the 1.8+4.8 g/L system from FIG. 3 with the corresponding 4.8+1.8 g/L system. Again, the system with the higher loaded zone in the rear position outperforms the system with the higher loaded zone in the front position.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An exhaust system trap comprising:
   a first section comprising:
      a precious metal having a first concentration (C1); and
      a first NO$_x$ absorber; and
   a second section downstream of the first section, comprising:
      a precious metal having a second concentration (C2)>C1; and
      a second NO$_x$ absorber,
   the trap having an increased NO$_x$ removal efficiency relative to an identical trap except for having (C1+C2)/2 as the concentration in both sections under identical operating conditions.

2. The lean NO$_x$ trap of claim 1 wherein the lean NO$_x$ trap is positionable in the automobile exhaust such that exhaust gases enter the lean NO$_x$ trap through the first section and exit the lean NO$_x$ trap through the second section and wherein precious metal concentrations along planes of the first and second sections in the lean NO$_x$ trap that are perpendicular to an axial direction from the first section to the second section vary by less than about 20 weight percent.

3. The lean NO$_x$ trap of claim 2 wherein precious metal concentrations along planes of the first and second sections in the lean NO$_x$ trap that are perpendicular to the axial direction are substantially constant.

4. The lean NO$_x$ trap of claim 1 wherein the first section has a first section region over which the concentration of the precious metal is substantially constant and the second section has a second section region over which the concentration of the precious metal is substantially constant, the first section region having a lower concentration of precious metal than the second section region.

5. The lean NO$_x$ trap of claim 1 wherein the first concentration of precious metal varies over the first section and the second section of precious metal varies over the second section such that the first section has a first average concentration of precious metal and the second section has a second average concentration of precious metal, the first average concentration being lower than the second average concentration.

6. The lean NO$_x$ trap of claim 1 wherein the first concentration of the precious metal is from about 10 grams/ft³ to about 110 grams/ft³ and the second concentration of the precious metal is from about 60 grams/ft³ to about 200 grams/ft³.

7. The lean NO$_x$ trap of claim 1 wherein the first concentration of the precious metal is from about 20 grams/ft³ to about 70 grams/ft³ and the second concentration of the precious metal is from about 50 grams/ft³ to about 160 grams/ft³.

8. The lean NO$_x$ trap of claim 1 wherein the first concentration of the precious metal is from about 30 grams/ft³ to about 60 grams/ft³ and the second concentration of the precious metal is from about 90 grams/ft³ to about 130 grams/ft³.

9. The lean NO$_x$ trap of claim 1 wherein an average concentration of the precious metal is from about 40 grams/ft³ to about 100 grams/ft³.

10. The lean NO$_x$ trap of claim 1 wherein the precious metal is selected from the group consisting of platinum, palladium, rhodium, and mixtures thereof.

11. The lean NO$_x$ trap of claim 1 wherein the first NO$_x$ absorber and the second NO$_x$ absorber are each independently selected from the group consisting of oxides of alkali metals, oxides of alkaline earth metals, and combinations thereof.

12. The lean NO$_x$ trap of claim 1 wherein the first NO$_x$ absorber and the second NO$_x$ absorber are each independently selected from the group consisting of cesium oxide, potassium oxide, magnesium oxide, sodium oxide, calcium oxide, strontium oxide, barium oxide, and combinations thereof.

13. An automobile exhaust system comprising the lean NO$_x$ trap of claim 1.

14. The automobile exhaust system of claim 13 further comprising one or more additional catalysts.

15. The automobile exhaust system of claim 14 wherein the one or more additional catalysts include a three-way catalyst positioned upstream of the lean NO$_x$ trap.

16. A lean NO$_x$ trap comprising:
   a first section comprising:
      a precious metal present in a first concentration from about 10 grams/ft³ to about 110 grams/ft³; and
      a first NO$_x$ absorber; and
   a second section positioned downstream of the first section when the lean NO$_x$ trap is placed in an automobile exhaust system, the second section comprising:
      a second NO$_x$ absorber;
      a precious metal present in a second concentration from about 40 grams/ft³ to about 200 grams/ft³,
   wherein the first concentration of the precious metal is lower than the second concentration of the precious metal,
   and wherein the trap has an increased NOx removal efficiency relative to an identical trap except for having (C1+C2)/2 as the concentration in both sections under identical operating conditions.

17. The exhaust system trap of claim 1, wherein the first and second sections each have a volume of V1 and V2 respectively, and wherein the average of C1 and C2 is represented by the formula of (C1*V1+C2*V2)/(V1+V2).

18. The exhaust system trap of claim 17, wherein the average of C1 and C2 is represented by the formula of (C1+C2)/2 when V1=V2.

19. An exhaust system trap comprising:
   a first section comprising:
      a precious metal having a first concentration (C1); and
      a first NO$_x$ absorber; and
   a second section downstream of the first section, comprising:
      a precious metal having a second concentration (C2)>C1; and
      a second NO$_x$ absorber,
   the trap having same NO$_x$ removal efficiency relative to a trap having otherwise identical operating conditions except for having an average concentration C2 for both sections.

20. The exhaust system trap of claim 19, wherein the first and second sections each have a volume V1 and V2 respectively, and wherein V1 is no greater than V2.

* * * * *